UNITED STATES PATENT OFFICE.

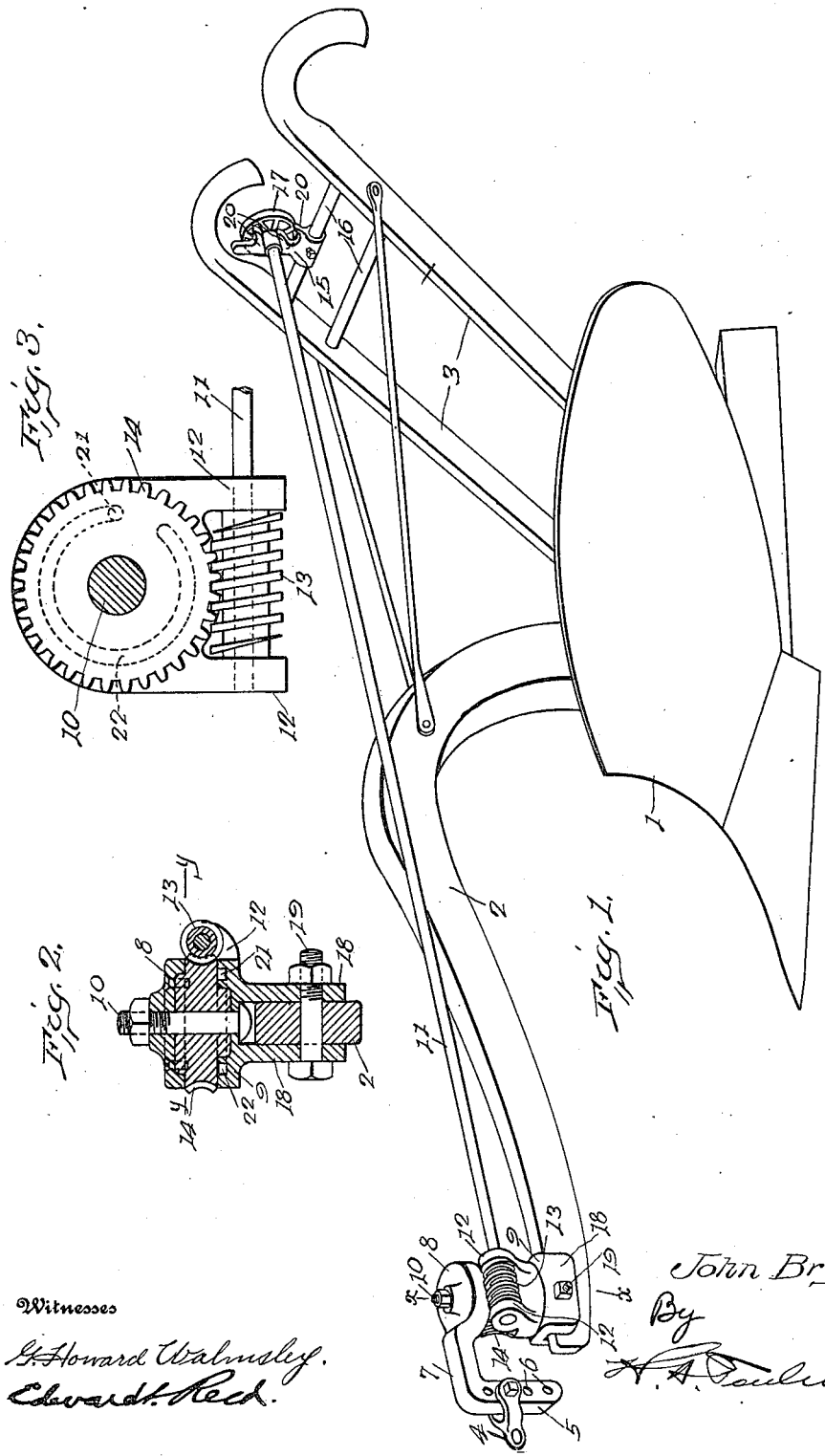

JOHN BRYAN, OF YELLOW SPRINGS, OHIO.

PLOW.

994,120.　　　　Specification of Letters Patent.　　Patented June 6, 1911.

Application filed February 11, 1910. Serial No. 543,260.

*To all whom it may concern:*

Be it known that I, JOHN BRYAN, a citizen of the United States, residing at Yellow Springs, in the county of Greene and State of Ohio, have invented certain new and useful Improvements in Plows, of which the following is a specification, reference being had therein to the accompanying drawings.

This invention relates to plows, and more particularly to means for connecting the draft-hitch to the plow.

The object of the invention is to provide adjustable means for connecting the draft-hitch to the beam of the plow which can be actuated by the operator from his position in the rear of the plow to cause the plow to turn a curved furrow; further, to provide connecting means which will be vertically adjustable to enable the angular relation of the plow share to the surface of the ground to be controlled by the operator from his position in the rear of the plow; and to so construct the device that these two adjustments will not interfere one with the other and that they may be made and used independently one of the other or both may be used simultaneously.

In the accompanying drawings, Figure 1 is a perspective view of a plow embodying my invention; Fig. 2 is a vertical, sectional view, taken on the line $x$ $x$ of Fig. 1; and Fig. 3 is a transverse, sectional view, taken on the line $y$ $y$ of Fig. 2.

In these drawings I have illustrated one embodiment of my invention and have shown the same as applied to a plow of well known construction. This plow comprises a share 1 having the usual beam 2 and handles 3. Mounted upon the forward end of the beam 2 is a connecting member for connecting the draft-hitch to the beam. The draft-hitch may be of any suitable character and I have, therefore, here shown only the link by means of which it is secured to the connecting member, which is indicated at 4. The connecting member, which may be of any suitable construction, is preferably a modified form of the usual clevis and is laterally adjustable relatively to the beam 2. As here shown this connecting member or clevis comprises a vertical arm 5 having therein a series of apertures 6. This arm has a rearwardly extending substantially horizontal portion 7 provided at its rear end with a plate or bearing block 8 which is pivotally connected to the end of the beam to move about a vertical axis. This vertical axis is fixed against lateral displacement and the arm 5 of the clevis is caused to travel in the arc of a circle described about said axis. The bearing block or plate 8 is preferably secured to the beam by means of a supporting plate 9 which is mounted on the beam and firmly secured thereto and to which the bearing block is connected by means of a vertical bolt 10 extending through the two members. Suitable means are connected to the bearing block 8 to move the same about its pivotal center and thus cause the clevis or connecting member 5 to be adjusted laterally relative to the beam. This means is also preferably of such a character and is arranged in such a manner that it can be operated by the plowman from his position in the rear of the plow. As here shown this connecting member comprises an operating rod or shaft 11 mounted at its forward end in bearing lugs 12 secured to the supporting plate 9 and preferably cast integral therewith. This portion of the operating rod 11 adjacent to the bearing block 8 is provided with a worm 13 adapted to mesh with a worm gear 14 formed on the lower portion of the bearing block 8. The operating rod 11 extends rearwardly and its rear end is supported by means of a suitable bearing bracket 15 supported by the handles 3, and. in the present instance, carried by one of the transverse bars 16 connecting said handles and forming a part thereof. The operating rod is also provided at its rear end with a hand wheel 17, by means of which the rod may be readily rotated and the lateral position of the clevis and draft-hitch adjusted relatively to the beam.

By the proper adjustment of the draft-hitch relatively to the beam the plow-share may be caused to travel in a curved line, thereby enabling a corner to be turned without removing the plow from the ground or interrupting the furrow. The connecting member or clevis 5 may also be made adjustable vertically relative to the beam 2 and this adjustment likewise may be controlled by the operator or plowman from his position in the rear of the plow, thereby enabling him to control the depth of the furrow. In the present instance this vertical adjustment is accomplished by pivotally connecting the supporting plate 9 which carries the bearing block 8 and clevis 5 to the forward end of the beam 2 upon a horizontal pivot extending transversely to the beam. To this end the supporting plate 9 is preferably provided with two depending flanges or lugs 18 arranged one on each side of the beam 2 and pivotally connected thereto by means of a bolt 19. The lugs or flanges 18 are connected to the beam 2 at such a point that the plate 9 will be supported some distance above the upper edge of the beam, and, consequently, will be capable of a limited movement about the horizontal pivot or bolt 19. This movement may be imparted to the clevis and its supporting members by means of the operating rod 11, and, to this end, the bearing bracket 15 for the rear end of the operating rod is shown as provided with a series of bearing arms 20 arranged one above the other and adapted to support the rear end of the operating rod in different vertical positions and thus maintain the clevis and draft-hitch in their vertically adjusted positions.

The operation of the device will be readily understood from the foregoing description and it will be apparent that the plowman, from his position in the rear of the plow, may control the position of the draft-hitch relatively to the plow beam and thus cause the plow-share to travel in a straight or a curved line and may control the degree of curvature. It will also be noted in this connection that the construction of the connecting member or clevis is such that the arm 7 thereof will pass above the worm on the operating rod and its bearings, and, consequently, the clevis can be moved through an arc of the desired number of degrees, its movement being limited by a stop 21 secured to the lower surface of the bearing block 8 and traveling in a groove 22 formed in the upper surface of the supporting plate 9. Further, it will be apparent that the plowman may also control from his position the vertical position of the clevis and the draft-hitch relatively to the end of the beam and in this manner may control the depth of the furrow. It will be noted that these adjustments do not interfere one with the other and that they may be used separately or simultaneously.

While I have herein shown and described a particular form of the invention and have shown the same as applied to a particular plow it will be understood that the invention may be applied to any type of plow and that the construction of the mechanism for adjusting the position of the clevis may be widely varied without departing from the spirit of my invention as I consider myself the first to have provided means whereby the lateral adjustment of the draft-hitch relative to the plow beam may be made by the plowman from his position in the rear of the plow and without interrupting the movement of the plow. I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a plow, the combination, with a beam, and handles, of a laterally adjustable clevis, a bearing block rigidly secured to said clevis and pivotally mounted on said beam to move about a vertical axis, a horizontal worm gear carried by said bearing block, a worm supported by said beam and in mesh with said worm gear, and an operating rod connected to said worm and extending rearwardly to a point near said handles.

2. In a plow, the combination, with a beam, and handles, of a supporting plate secured to the forward end of said beam, a bearing block mounted on and pivotally connected to said supporting plate, a clevis rigidly secured to said bearing block, a worm gear carried by said bearing block, a worm rotatably supported by said supporting plate, a rod operatively connected to said worm at one end and supported at its other end on said handles.

3. In a plow, the combination, with a beam, of a supporting plate pivotally mounted on said beam to move about a horizontal axis, a bearing block pivotally mounted on said supporting plate to move about an axis fixed vertically with reference to said plate, and a clevis rigidly secured to said bearing block.

4. In a plow, the combination, with a beam, and handles, of a supporting plate pivotally mounted on said beam to move about a horizontal axis, a bearing block pivotally mounted on said supporting plate to move about an axis fixed vertically with reference to said plate, a clevis rigidly secured to said bearing block, and a rod operatively connected at one end to said bearing block and supported at its opposite end on said handles.

5. In a plow, the combination, with a beam, and handles, of a supporting plate pivotally mounted on said beam to move about a horizontal axis extending transversely to said beam, a clevis connected to said supporting plate, a bearing bracket supported by said handles and having a vertically arranged series of bearings, and an operating rod connected at one end to said supporting plate and adapted to be rotatably mounted in any one of the bearings of said bracket.

In testimony whereof, I affix my signature in presence of two witnesses.

JOHN BRYAN.

Witnesses:
 ELZA F. McKEE,
 HENRY MUFFLER.

Copies of this patent may be obtained for five cents each, by addressing the "Commissioner of Patents, Washington, D. C."